(12) United States Patent
Morovic et al.

(10) Patent No.: US 9,936,104 B2
(45) Date of Patent: Apr. 3, 2018

(54) PRINTING PROCESS AND PRINTING SYSTEM TO DISPLAY PRINT PREVIEW WITH UPDATED COLOR MODEL

(71) Applicant: Hewlett-Packard Development Company, L.P., Houston, TX (US)

(72) Inventors: Peter Morovic, Sant Cugat del Valles (ES); Jan Morovic, Colchester (GB); Xavier Farina Vargas, Sant Cugat del Valles (ES); Juan Manuel Garcia Reyero Viñas, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/113,531

(22) PCT Filed: Jan. 30, 2014

(86) PCT No.: PCT/EP2014/051852
§ 371 (c)(1),
(2) Date: Jul. 22, 2016

(87) PCT Pub. No.: WO2015/113610
PCT Pub. Date: Aug. 6, 2015

(65) Prior Publication Data
US 2017/0013174 A1    Jan. 12, 2017

(51) Int. Cl.
*H04N 1/60* (2006.01)
*H04N 1/00* (2006.01)

(52) U.S. Cl.
CPC ......... *H04N 1/6055* (2013.01); *H04N 1/0044* (2013.01); *H04N 1/6008* (2013.01)

(58) Field of Classification Search
CPC ... H04N 1/6055; H04N 1/6008; H04N 1/0044
See application file for complete search history.

(56) References Cited

U.S. PATENT DOCUMENTS 6,388,674 B1 * 5/2002 Ito ........................ H04N 1/6058
                                                                345/589
6,549,653 B1    4/2003 Osawa et al.
(Continued)

FOREIGN PATENT DOCUMENTS

EP        1139654        10/2001

OTHER PUBLICATIONS

Meng, Tao, et al. "Spectral Prediction Model for Halftone Prints by Enhanced Clapper-Yule Model." In Advanced Materials Research, Jan. 24, 2012, vol. 457, pp. 1405-1408.
(Continued)

*Primary Examiner* — Christopher D Wait
(74) *Attorney, Agent, or Firm* — HP Inc. Patent Department (57) ABSTRACT

Certain methods and systems are described to provide color modelling. This color modelling applies to halftone images. In one example, a correction parameter for a color model is determined by minimizing a distance metric between a set of estimated spectral reflectance values and a set of measured spectral reflectance values to generate a multi-dimensional correction parameter. This enables a color model to be used to map at least one Neugebauer Primary area coverage value to at least one spectral reflectance value.

9 Claims, 7 Drawing Sheets

(56) References Cited

U.S. PATENT DOCUMENTS

| | | | |
|---|---|---|---|
| 7,252,360 | B2 | 8/2007 | Hersch et al. |
| 7,365,878 | B2 | 4/2008 | Nakagawa |
| 7,423,778 | B2 | 9/2008 | Hersch et al. |
| 7,830,568 | B2 | 11/2010 | Tsutsumi |
| 8,355,169 | B2 | 1/2013 | Hersch et al. |
| 2008/0012876 | A1 | 1/2008 | Fejfar |
| 2010/0214576 | A1* | 8/2010 | Morovic ............... H04N 1/52 358/1.9 |
| 2014/0016143 | A1* | 1/2014 | Morovic ............ H04N 1/6016 358/1.9 |

OTHER PUBLICATIONS

Balasubramanian R, "Optimization of HTE Spectral Neugebauer Model for Printer Characterization," Journal of Electronic Imaging, SPIE/IS & T, 1000 20th St. Bellingham WA 98225-6705, USA, vol. 8, No. 2, Apr. 1, 1999 (Apr. 1, 1999), pp. 156-166.

Wang, B. et al, "Maintaining accuracy of cellular Yule-Nielsen spectral Neugebauer models for different ink cartridges using principal component analysis," Journal of the Optical Society of America. vol. 28, No. 7, Jul. 1, 2011 (Jul. 1, 2011), p. 1429.

\* cited by examiner

$$R_M^{npac} = \begin{Bmatrix} R(\lambda_0) \\ R(\lambda_1) \\ R(\lambda_2) \\ \vdots \\ R(\lambda_m) \end{Bmatrix} \leftarrow 620 \qquad \leftarrow 600$$

$$R_M = [R_M^0, R_M^1, R_M^2, \cdots, R_M^q] \quad \leftarrow 630$$

$$\mathbf{NPac} = [NP_{ac}^1, NP_{ac}^2, NP_{ac}^3, \cdots, NP_{ac}^L] \quad \leftarrow 640$$

$$\widehat{R}_E^{npac} = \begin{Bmatrix} R(\lambda_0) \\ R(\lambda_1) \\ R(\lambda_2) \\ \vdots \\ R(\lambda_t) \end{Bmatrix} \leftarrow 650$$

PRINTING PROCESS AND PRINTING SYSTEM TO DISPLAY PRINT PREVIEW WITH UPDATED COLOR MODEL

CROSS-REFERENCE TO RELATED APPLICATION

This application is a U.S. National Stage Application of and claims priority to International Patent Application No. PCT/EP2014/051852, filed on Jan. 30, 2014, and entitled "COLOR MODEL," which is hereby incorporated by reference in its entirety.

BACKGROUND

"Color" is a concept that is understood intuitively by human beings. However, it is a subjective phenomenon rooted in the retinal and neural circuits of a human brain. Typically, "a color" is a category that is used to denote similar visual perceptions; two colors are said to be the same if they produce a similar effect on a group of one or more people. The concept of color presents a challenge for those constructing technical devices. Different devices in a publication pipeline may output a supposedly common color in different ways, leading to a perceived color discrepancy. For example, a preview of a color forming part of a digital image that is shown on a computer monitor may be perceived differently from the same color forming part of a printed output. Alternatively, a document having one perceived color may be scanned and the digital representation of the document may be perceived as having a different color. Discrepancies in color may be due to one or more of varying representations of color in each device and the nature and configuration of different color sensors and color actuators.

DETAILED DESCRIPTION

Certain examples as described herein are applicable to halftone images. According to one definition, a halftone image comprises a plurality of pixels wherein the spatial density of the layout of the pixels control the colorimetry of different areas of the image. Typically, a halftone image is designed to be printed on a printing device. Each halftone pixel in a printed image may relate to a droplet of printing fluid or ink released, for example, by a print-head of the printing device. The overall result of the plurality of dots in the printed image produces a color or monochrome image.

Materials, time and resources used for making a printed publication may be wasted if a printed output exhibits undesirable color characteristics. An artifact in a color transition, a seemingly "unnatural" color case in a face or perceived differences in a brand color can all be reasons for rejecting a print and thereby wasting the resources used for making it. This is especially the case for large scale print jobs where image data varies between portions of the job. It is therefore useful to be able to generate a color accurate preview of a print that will exhibit all the features of the resulting print without committing resources to a printed output.

Figure 1:
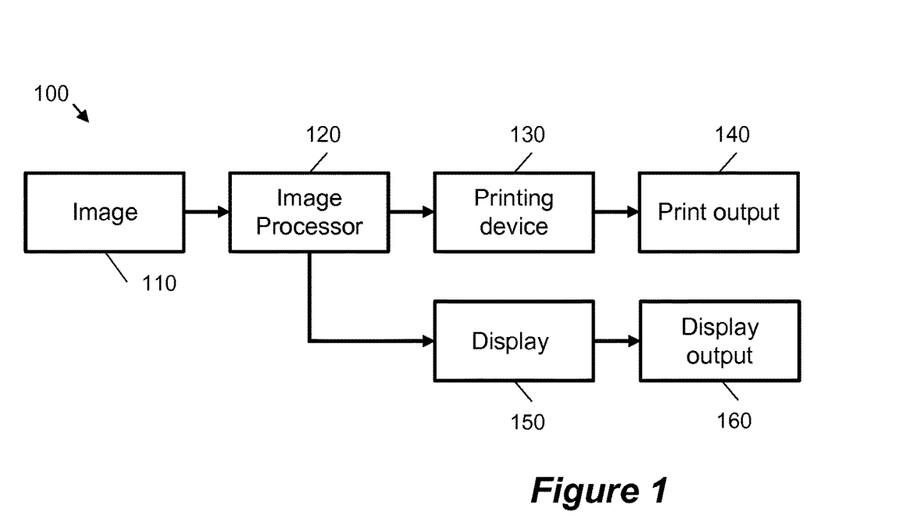
FIG. 1 is a schematic diagram showing a printing system for producing a print output according to an example.

FIG. 1 shows an exemplary printing system 100 that may be used to print and/or view halftone images. In the example of FIG. 1, image data corresponding to an image 110 is received by an image processor 120. The image processor 120 processes the image data. The image 110 may comprise one or more halftone portions and/or may be processed by the image processor 120 to define one or more halftone portions. The printing system 100 comprises two devices that use processed image data to generate an output. The first device comprises a printing device 130 that is arranged to produce a print output 140. The second device comprises a display 150 that is arranged to produce a display output 160. The print output 130 comprises colored inks deposited on a print medium. In one case, the image processor 120 may output print control data that is communicated to a printing device 130. This print control data is generated from the image data. The printing device 130 then generates the print output 140 as instructed by the print control data. Similarly, display 150 is arranged to receive display control data from the image processor 120. If the display is a device such as a Liquid-Crystal Display (LCD) monitor, the image processor 120 may communicate display control data in the form of one or more of, amongst others: a Video Graphics Array (VGA) signal; a Digital Visual Interface (DBI) signal; and a High-Definition Multimedia Interface (HDMI) signal. In one case, the image processor 120 may pass intermediary control data, such as a Red, Green, Blue (RGB) image or the like, to a hardware and/or software component that generates the appropriate display control data.

In the printing system 100 of FIG. 1, for a given image, it is desired that a perception of the display output 160 matches a perception of the print output 150. For example, if the image 110 comprises one or more color halftone portions, it is desired that what is shown on the display 150, e.g. a print preview, accurately predicts the appearance of what is to be printed on the printing device 130. In the examples described herein, generating color-accurate print previews uses a method of accurately depicting colorimetry, wherein a resultant display output exhibits characteristics that will be seen in print. Certain methods apply a spectral reflectance model that facilitates estimation of reflectance based on image and/or print data, e.g. of a predicted reflectance for a printed output.

For example, comparative examples often operate on source color only. This source color may be an RGB image or an RGB image transformed into International Commission on Illumination (CIE) XYZ or Lab color space. These comparative examples may not consider a set of transformations applied by different stages of a print-processing pipeline. However, certain methods and system as described herein process image data for display using one or more print-processing operations that are used to produce a printed output. Color visualizations are then produced from halftone data that results from the one or more print-processing operations.

In a first example, an extended spatio-spectral model is configured based on printed and measured color patches. Particular color models, such as one or more of the Kubelka-Munk, Neugebauer and Yule-Nielsen models, may form part of this extended spatio-spectral model, together with a custom error minimizing transformation in the spectral domain. This error minimizing correction may comprise a polynomial matrix correction. The latter results in more accurate color matching between a print preview and a printed output.

Figure 2:
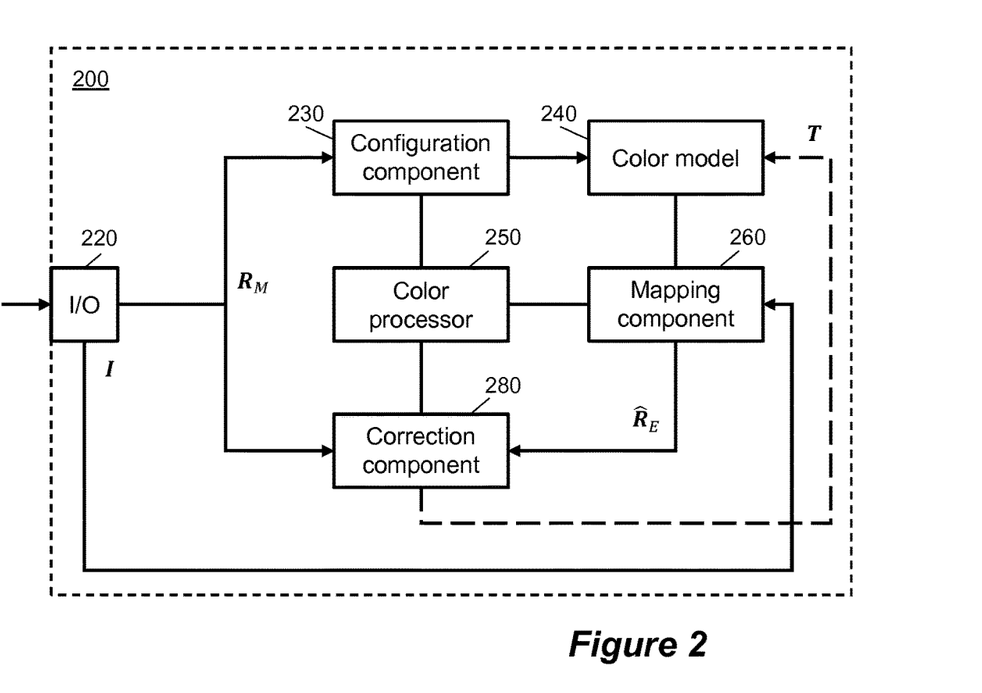
FIG. 2 is a schematic diagram showing components for updating a color model according to an example.

In a second example, an extended spatio-spectral model is applied to image content. In this case, 'patches' of color may be dynamically computed based on a set of print-resolution halftone pixels to generate a set of display-resolution display pixels. This print-preview technique may comprise computing ink-drop-state statistics depending on one or more factors such as image size, zoom factor and the aforementioned resolutions. The result gives an accurate color preview that can be used for pre-print validation. This color preview is able to accurately depict, amongst others, one or more of detail, transitions, lines and possible artifacts, e.g. in relation to halftone portions of an image. As the color preview is accurate, and may be viewed on a display before printing, multiple, failed printing attempts to configure a color match may be avoided and/or at least minimized. This offers a true "What-You-See-Is-What-You-Get" (WYSIWYG) preview. FIG. 2 shows a system 200 that may implement image processor 120 in FIG. 1 according to one example. The system 200 comprises an interface 220, a configuration component 230, a color model 240, a color processor 250, a mapping component 260 and a correction component 280. The interface 220 is arranged to receive at least one of image data, I, and measured spectral reflectance values, $R_M$. In one case the interface 220 may comprise separate interfaces for each of the image data and measured spectral reflectance values; in another case a common interface may be used for both sets of data. In one case the interface 220 may comprise any component arranged to access one or more of the data sets, including a file input/output the halftone image and print preview corresponds to determining aerface for receiving a data stream, e.g. from a measurement device or data-store. In the example of FIG. 2, the interface 220 is communicatively coupled to the configuration component 230, the mapping component 260 and the correction component 280. The configuration component 230 and the correction component 280 are arranged to receive a set of measured spectral reflectance values, $R_M$, via the interface 220. The mapping component 260 is arranged to receive at least image data, I, by way of interface 220.

In the system 200 of FIG. 2, color processor 250 is communicatively coupled to, and arranged to control operation of, each of the configuration component 230, the mapping component 260 and the correction component 280. The configuration component 230 is arranged to derive parameters for color model 240 based at least on the measured spectral reflectance values, $R_M$. The mapping component 260 is then arranged to use the color model 240 to map image data, I, to a set of estimated reflectance values, $\hat{R}_E$. The correction component 280 is communicatively coupled to the mapping component 260 and is arranged to receive estimated reflectance values, $\hat{R}_E$. The correction component 280 is arranged to compare two sets of reflectance values and to output a correction factor for the color model based on the comparison. The correction factor is used to update the color model configured using the configuration component 230. In FIG. 2, the correction component 280 is arranged to compare the measured spectral reflectance values, $R_M$, and the estimated reflectance values, $\hat{R}_E$. The color model that results from system 200 provides improved color accuracy for mapping image data, I, to receive estimated reflectance values, $\hat{R}_E$. The system 200 may be used to output a predicted reflectance spectrum for an image to be printed.

The operation of the components of system 200 will now be described in more detail, with reference to particular examples.

Certain examples are arranged to use Neugebauer Primary area coverage (NPac) values as an input to the color model 240. In one case, the mapping component 260 in FIG. 2 is arranged to map image data—I—in the form of one or more NPac vectors, to one or more reflectance spectra.

In this case, a Neugebauer Primary (NP) comprises a combination of primary inks as used in a particular printing device. For example, the primary inks available to a printing device (i.e. the printable inks) may be: cyan, magenta and yellow (CMY); or cyan, light cyan, magenta, light magenta and yellow (CcMmY). The printing device may be printing device 130. In these examples, a black or Key ink—'K'—may be added. Although, four- or six-ink systems are often more common than a three-ink CMY system, the latter is used herein as a simplified example; the methods and system may of course be applied to systems with any number of inks, including common four- or six-ink systems. The printing device may be adapted to deposit these inks onto a printing medium, e.g. ink may be supplied from one or more ink cartridges and deposited onto a print medium through the use of one or more nozzle actuators. For a binary (bi-level) printer, a Neugebauer Primary is one of $2^k$ combinations of k inks within the printing system, wherein ink concentrations are at 0% or 100% in a k-dimensional color space. For example, if a printing device uses CMY inks there can be eight NPs: C, M, Y, C+M overprinting (or blue), C+Y overprinting (or green), M+Y overprinting (or red), C+M+Y overprinting (or black), and W (or white or blank indicating an absence of ink). As is clear, a printing device with many primary inks and many ink-drop states can have more NPs available than a printing device with only a few primary inks and only bi-level states.

Given this definition of an NP, an NPac comprises a distribution of NPs over a unit area, e.g. percentages of an area of a halftone that is covered by particular NPs. For example, in a CMYK printing system, a unit area on a printed output may have 30% covered with Cyan (NP=C), 30% with Cyan and Magenta (NP=CM) and 40% with no ink coverage (NP=W). The corresponding NPac vector for this unit area may thus be presented as: [C=0.3, Y=0, M=0, CM=0.3, CY=0, MY=0, CMY=0, W=0.4] or [0.3, 0, 0, 0.3, 0, 0, 0, 0.4].

Figure 3A:
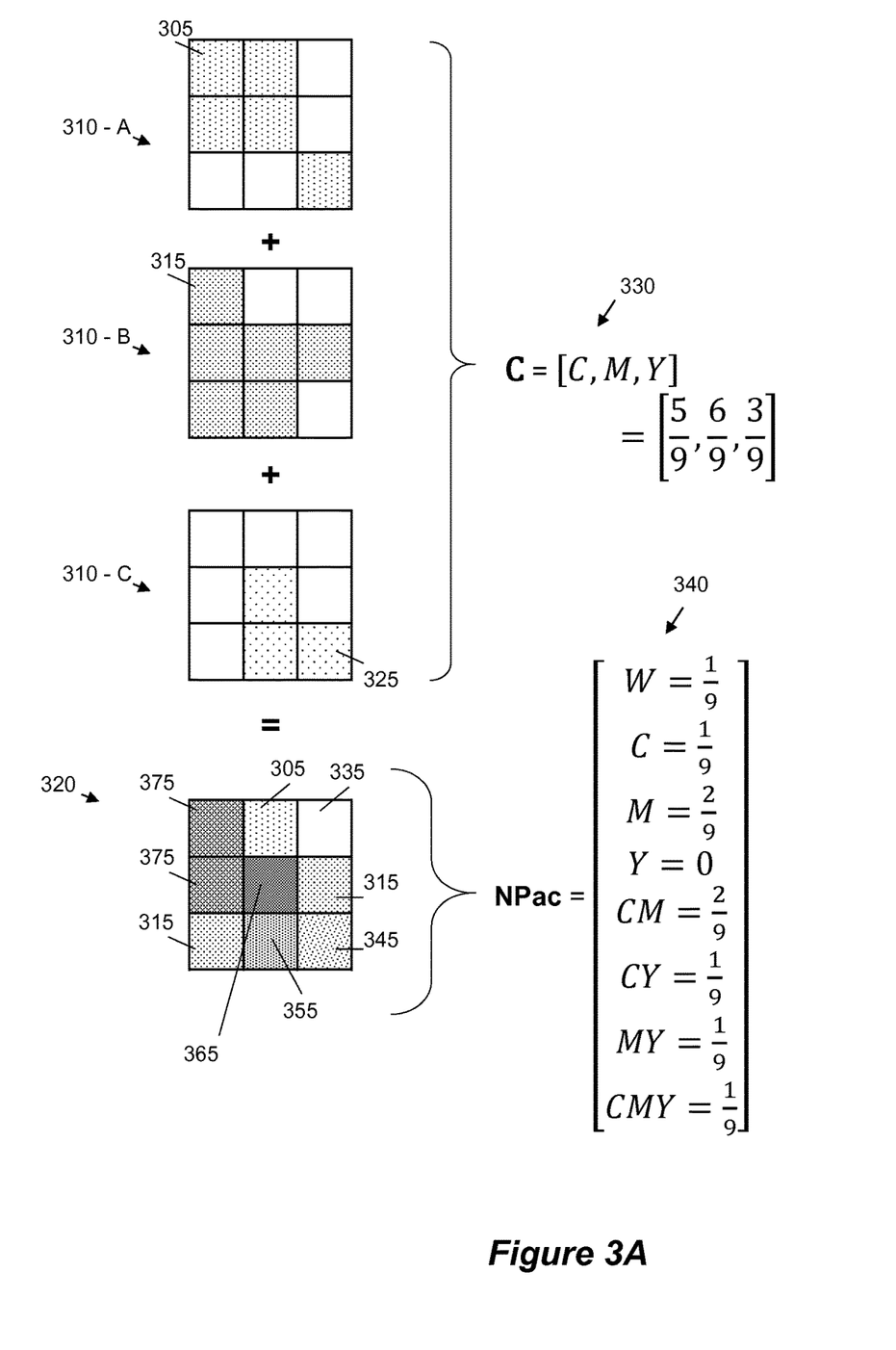
FIG. 3A is a schematic diagram showing an example Neugebauer Primary area coverage vector.

FIG. 3A shows an example NPac vector for a CMY printing system. This example shows an area for a print that comprises a three-by-three pixel area 310, 320. In an additive print operation, three colorants C—305, M—315, and Y—325 are to be printed within this three-by-three pixel area. For the Cyan colorant—305—five pixels are to be printed as shown by the pattern 310-A. For the Magenta colorant—315—six pixels are to be printed as shown by the pattern 310-B. For the Yellow colorant—325—three pixels are to be printed as shown by the pattern 310-C. In this example, each colorant is to be overprinted, e.g. each pattern 310-A to C is to be printed in order within a three-by-three pixel area. A colorant vector 330 representing the different proportions is shown in FIG. 3A. In this context, an NPac vector is representative of the color combinations within the three-by-three pixel area. For example, pattern 320 shows that the addition of the three colorants—C, M and Y—results in: one pixel of White (W)—335; one pixel of Cyan (C)—305; two pixels of Magenta (M)—315; no pixels of Yellow (Y); two pixels of Cyan+Magenta (CM)—375; one pixel of Cyan+Yellow (CY)—345; one pixel of Magenta+Yellow (MY)—355; and one pixel of Cyan+Magenta+Yellow (CMY)—365. For the unit area of a three-by-three pixel in this example, the NPac vector 340 is shown in FIG. 3A. As can be seen in FIG. 3A, the component values of each NPac vector sum to one, i.e. represent the total area of the unit area.

Although an example three-by-three pixel area is shown in FIG. 3A, this is for ease of explanation; the unit area may be of any size and/or there may be multiple levels of units. For example, each pixel of a halftone may have a corresponding NPac vector. In this case, in a binary printing system, for a halftone pixel, one NP may have a value of 1 and the other NPs may have a value of 0. However, this pixel may form part of a halftone neighborhood, e.g. a three-by-three area as shown, that itself is defined by an NPac vector. Likewise, a CMY system is used for ease of explanation but other printing systems may be used.

Figure 3B:
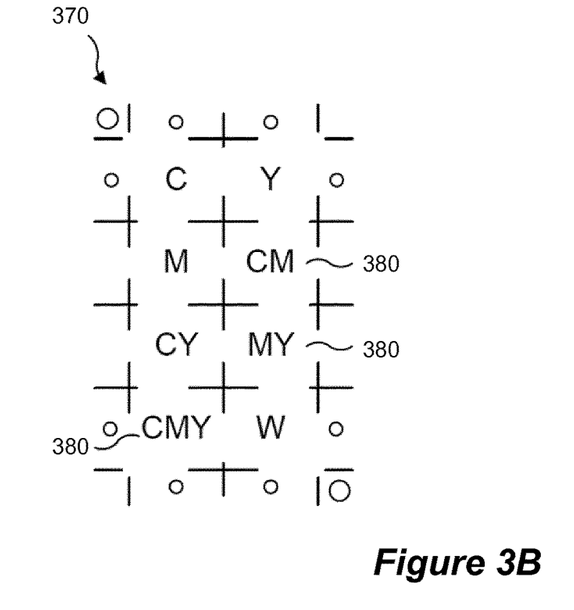
FIG. 3B is an illustration showing an example of an ink template for use with certain described examples.

Putting this into practice, FIG. 3B shows an example ink template 370 that may be used to obtain a plurality of measured spectral reflectance values, $R_M$, for a given printing device. The ink template 370 has a number of test portions 380 that correspond to each NP. In the example of FIG. 3, the given printing devices uses CMY inks, hence there are eight test portions 380 corresponding to each of the NPs: C, Y, M, CM, CY, MY, CMY and W. In use, a number of sets of the template 370 are printed using the printing device. Each set prints the NP test portions at a different area coverage. The reflectances of each printed test portion for each of the sets is then measured to provide measured reflectance values. In one case, the measured reflectance values may comprise a plurality of reflectance values wherein each value corresponds to a different sample wavelength in the visible spectrum, i.e. the measured reflectance values may represent a reflectance spectrum for a particular test portion 380. Examples of reflectance spectra for a set of test portions are shown in FIGS. 5A to 5C.

Figure 4:
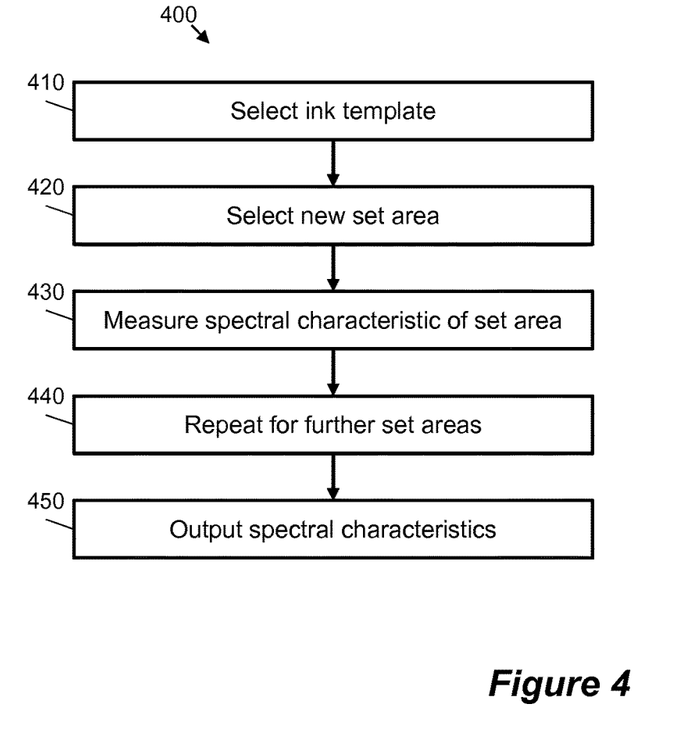
FIG. 4 is a flow chart showing a method for obtaining spectral characteristics according to an example.

A method 400 of obtaining a set of measured spectral reflectance values, $R_M$, for a given printing device is shown in FIG. 4. This method 400 uses the ink template 370. In block 410, an ink template 370, as described above, is selected. At block 420, a set area coverage for the use in printing present template is selected. For example, a range of area coverages may be selected for each template. In one case there may be 10 templates with respective area coverages of [10%, 20%, 30%, 40%, 50%, 60%, 70%, 80%, 90% and 100%]; in another case there may be 20 templates with step changes in area coverage of 5%. The exact number of templates and changes in area coverage may depend on the implementation; more samples may provide better model accuracy at the cost of a more laborious sample process. At block 430, each ink template 370 is printed on the given printing device. In the aforementioned example with 10 templates, a first ink template may comprise 8 test portions 380 with each NP printed at a 10% area coverage, e.g. 10% of the area of each test portion 380 is printed with each ink. In one case, the different area coverages are printed using a halftone scheme.

Once the ink template 370 is printed each test portion is measured to determine one or more measured spectral reflectance values. For example, each test portion 380 may be measured using a spectrophotometer. Such a spectrophotometer may output a reflectance spectrum for each test portion. At block 440, this is repeated for each ink template to obtain measured spectral reflectance values for the selected range of area coverages. Once all ink templates have been processed, a set of measured spectral reflectance values representing different NPac values is output at block 450. For example, a third ink template in a set of 10 may represent seven NPac vectors: [0.3, 0, 0, 0, 0, 0, 0, 0.7]; [0, 0.3, 0, 0, 0, 0, 0, 0.7]; [0, 0, 0.3, 0, 0, 0, 0, 0.7]; [0, 0, 0, 0.3, 0, 0, 0, 0.7]; [0, 0, 0, 0, 0.3, 0, 0, 0.7]; [0, 0, 0, 0, 0, 0.3, 0, 0.7]; and [0, 0, 0, 0, 0, 0, 0.3, 0.7]. As each NPac vector must sum to a unit value, for 30% ink coverage the value of the corresponding white NP is 70%.

Figure 5A:
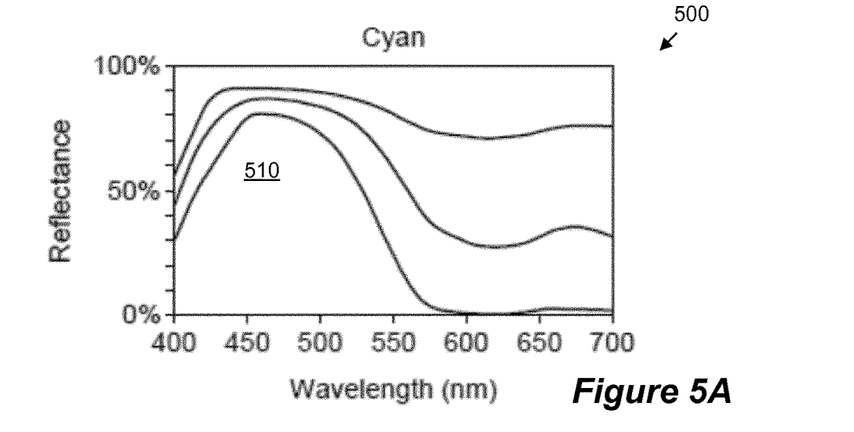
FIGS. 5A to 5C are charts showing exemplary reflectance spectra for a number of different printing fluids.
Figure 5B:
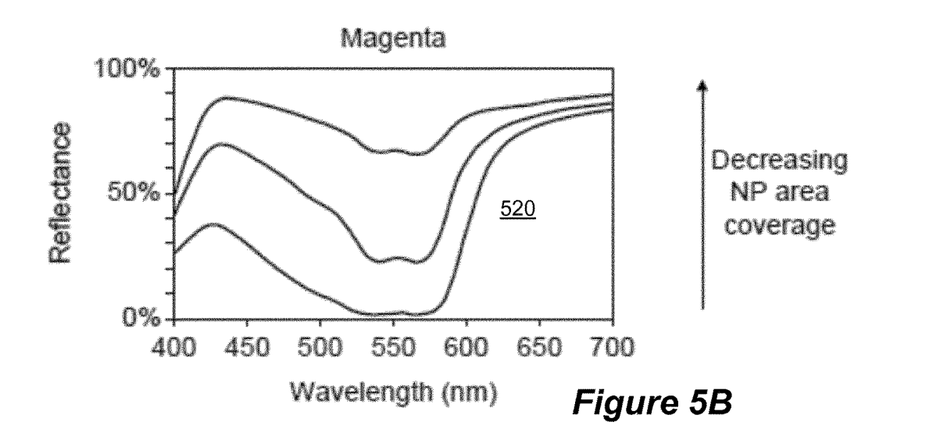
Figure 5C:
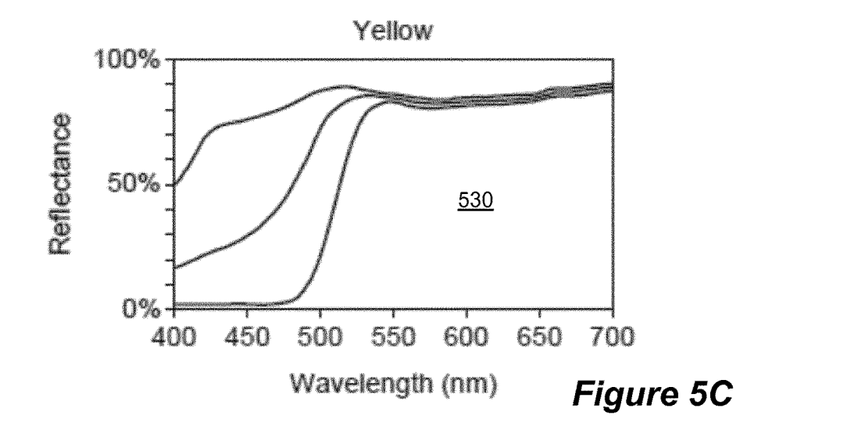

FIGS. 5A to 5C show 9 exemplary spectra 500: three spectra for each of a Cyan (C) 510, Magenta (M) 520 and Yellow (Y) 530 test portion. Each set of three spectra illustrate how reflectance varies with NP area coverage: an upper line in each chart represents a low area coverage of the non-white NP, e.g. 10% or 20%; the middle line in each chart represents a median area coverage, e.g. 50%; and the lower line in each chart represents a high area coverage, e.g. 90% or 100%. In practice, a set of measured reflectance values representing a reflectance spectrum for a particular NPac vector may be limited to a particular set of wavelength sample values. This limitation may be set by the spectrophotometer or based on a desired computation complexity, e.g. each reflectance spectrum may be defined by measured spectral reflectance values corresponding to m wavelength samples. In this case, m may be 16, 32, 256, 1024 etc., with typical values being 16 or 31, when measurements are taken over a 400-700 nm range, and 81, when measurements are taken over a 380-780 range. Once obtained at block 450, the measured spectral reflectance values may be stored, e.g. in a database or file system, for retrieval at a later time or fed directly the system 200 in FIG. 2.

Following the process for obtain a set of measured spectral reflectance values, a process for configuring a color model will now be described. This process uses the measured spectral reflectance values to derive parameters for a color model that may be used to map NPac values to estimated spectral reflectance values, e.g. from a given NPac vector to an estimated reflectance spectrum. In one case, a color model is defined based on the application of Kubelka-Munk, Neugebauer and Yule-Nielsen models. The measured spectral reflectance values are used to derive parameters for these models. The derivation of these parameters may use known methods.

For example, a (spectral) Neugebauer model enables a reflectance value, $\hat{R}_E(\lambda)$, for a given wavelength, $\lambda$, to be estimated using the following equation:

$$\hat{R}_{E-SN}(\lambda) = \sum_{p=1}^{L} A_p R_p(\lambda)$$

where: $A_p$ is an area coverage for a given NP p; $R_p$ is a reflectance value, at given wavelength $\lambda$, of given NP p at full area coverage (e.g. 100%); and wherein there are L NPs.

In the described examples, the term $A_p R_p(\lambda)$, for a given area coverage is based on a measured spectral reflectance value for a given NPac, i.e. $R_M^p$. For example, this term may be interpolated from among measurements of samples with area coverages above and below $A_p$ or may be predicted using the Kubelka-Munk model.

The Neugebauer model may be extended using the Yule-Nielsen model to take account of light penetration and scattering in a print medium. To do this a power term is added to the above Neugebauer model equation:

$$\hat{R}_{E-YNSN}(\lambda) = \left[\sum_{p=1}^{L} A_p R_p(\pi)^{1/y(\lambda)}\right]^{y(\lambda)}$$

where y is, for a given wavelength, a parameter accounting for light spreading in a given print medium. If a printing system 100 uses multiple print media then parameters may be derived for each medium, e.g. by repeating the method of FIG. 4 for each medium. Typically, one or more values for y are calculated using a non-linear optimization.

Finally, estimated spectral reflectance values for a given NP at a given wavelength may be further predicted using a Kubelka-Munk model instead of directly measured. In this case the measured spectral reflectance values may be used to obtain absorption and scattering coefficients for the Kubelka-Munk model, these then being used to predict the spectral reflectance values of NPs, subsequently combined by the Yule-Nielsen Spectral Neugebauer model. Any one of the several variations of the Kubelka-Munk model may be used with the present examples. A simple case uses a single-constant to predict reflectance in a colorant system, wherein the system is modelled as employing water color paper and the ink is modelled as dying a defuse top layer of the paper. These cases may require first the computation of one or more ratios 'K/S' representing scattering to absorption ratios for each ink. Using this, the reflectance of a stack of ink layers can be predicted. This enables a prediction of the reflectance of a number of ink drops stacked on top of each other.

In the case described above, the color model may apply each of the, Kubelka-Munk, Neugebauer and Yule-Nielsen models in that order to an NPac value, e.g. an NPac vector, to output an estimated spectral reflectance value for a given wavelength $\hat{R}_E(\lambda)$. By determining parameters for the range of visible wavelengths, the color model may be used to map an NPac vector to an estimated reflectance spectrum. For example, the color model 240 may comprise at least the derived parameters such that it can be used by mapping component 260 to map an NPac value to an estimated spectral reflectance value.

Figure 6:
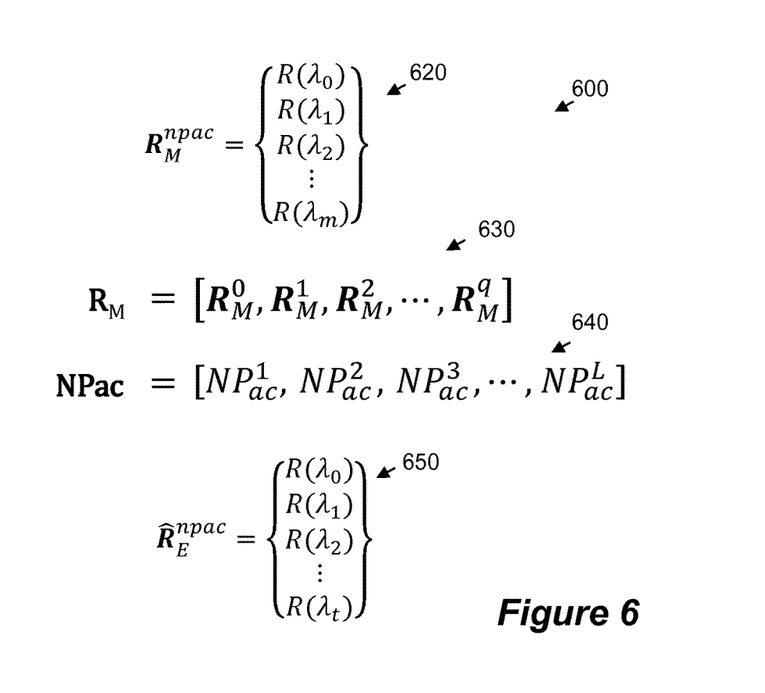
FIG. 6 is a schematic illustration showing an example of output spectral reflectances for inks.

FIG. 6 shows a number of exemplary variables 600 that may be used in the above described methods. First, FIG. 6 shows a set of measured spectral reflectance values 620 for a given NPac vector. In FIG. 6, there are s wavelength samples. As such, a set of measured spectral reflectance values that are used to calibrate a color model may comprise those illustrated in the array 630 in FIG. 6; i.e. a plurality of vectors $R_M^{npac}$ of length q, wherein q equals the number of test portions 380 in the set of ink templates 370 used in the method 400 of FIG. 4. For example, with a set of ten ink templates representing ten different area coverage values, q may equal 7*10+1=71, where the number of NPs (p) equals eight for a CMY system and where the white NP W only needs to be measured at 100% area coverage and is then combined with the other 7 NPs to form their 10-step ramps of varying area coverage. FIG. 6 also shows an exemplary NPac vector as described above, each value in the vector representing a particular area coverage for one of L NPs. Lastly, FIG. 6 shows an example of estimated spectral reflectance values 650, this set having t wavelength samples.

According to certain examples described herein, once a color model is initially configured, a correction parameter is calculated for the color model based on the measured spectral reflectance values. In particular, the color model is applied to the NPac values that were used to print each of the test portions and then an error between the resulting estimated spectral reflectance values and the measured spectral reflectance values is minimized. This results in the correction parameter, which is used to update the color model.

Returning to the system of FIG. 2, the color processor 250 may be arranged to instruct the configuration component 230 to configure the color model 240 as described above. At some time following configuration, the color processor 250 is further arranged to instruct mapping component 260 to map image data, I, to a set of estimated reflectance values, $\hat{R}_E$ using the configured color model 240. In particular, image data, I, comprises one or more NPac vectors. These NPac vectors may be calculated by image processor 120 as one process in the pipeline for printing an image 110 on printing device 130. The NPac vectors are typically those that are used to instruct the printing of the test portions 380 of ink templates 370 on printing device 130. In FIG. 2, these NPac vectors are accessed via interface 220 and are received by the mapping component 260. As described above, in a CMY example with ten area coverage levels there may be seventy one such NPac vectors. The mapping component 260 accesses at least the derived parameters of the color model 240 and computes estimated reflectance values, e.g. by the application of the Neugebauer, Yule-Nielsen and Kubelka-Munk models. For example, the mapping component 260 may receive a vector such as 620 as input and generate a vector such as 650 as an output.

Once the mapping component 260 outputs a set of estimated reflectance values, e.g. a sampled estimated reflectance spectrum for each input NPac vector, these are input to the correction component 280, together with the set of measured spectral reflectance values. Using the same CMY example with ten area coverage values, there may be seventy one measured spectral reflectance vectors, such as vector 620 in FIG. 6. In one case, correction component 280 takes the set of measured spectral reflectance values and the corresponding set of estimated reflectance values and outputs a multi-dimensional correction parameter based on the minimization of a distance metric between the two sets of reflectance values.

To calculate the multi-dimensional correction parameter the following process may be used. In one case, the correction parameter comprises an m by n matrix T, wherein m is the number of spectral samples used, e.g. as described with reference to vector 620, and n is representative of a number of terms in a distance minimization function. In one case, a distance minimization function with respect to the L2 norm comprises:

$$\|f(\hat{R}_E)*T - R_M\|$$

i.e. where f( . . . ) is a function for expanding the number of estimated spectral reflectance values. For example, f( . . . ) may add a constant term, a cross term and/or one or more power terms. Hence, in one case, n equals the number of polynomial expansion terms used. For example, in a simple hypothetical case where m=2, i.e.

$$\hat{R}_E^{npac} = \left\{ \begin{array}{l} R(\lambda_0) \\ R(\lambda_1) \end{array} \right\},$$

the result of the function f( . . . ) may comprise:

$$f(\hat{R}_E) = \left\{ \begin{array}{l} 1 \\ R(\lambda_0) \\ R(\lambda_1) \\ R(\lambda_0) * R(\lambda_1) \\ R(\lambda_0)^2 \\ R(\lambda_1)^2 \end{array} \right\}$$

In this case error minimizing coefficients forming part of T would be computed for these terms (e.g. a constant term, two linear terms, a cross-term and two second-order terms).

Following the minimization of the distance function as described above, the output of the correction component 280, e.g. the computed matrix T, is then used to update the color model 240. In one case, the updated color model 240 comprises the derived parameters for one or more of the Neugebauer, Yule-Nielsen and Kubelka-Munk models plus the computed matrix T. In this case, the mapping component 260 is arranged to apply the Kubelka-Munk, Neugebauer and Yule-Nielsen models in that order before applying the computed matrix T. The computed matrix T may be applied using the following equation:

$$\hat{R}_C = f(\hat{R}_E) * T$$

where $\hat{R}_C$ is a corrected set of one or more reflectance values, e.g. a corrected reflectance spectrum for an NPac and f( . . . ) is the function for expanding the number of estimated spectral reflectance values as described above. As will be described in more detail below, the corrected reflectance values provide a more accurate color estimate and in turn allow for a more realistic preview of a printed output.

Figure 7:
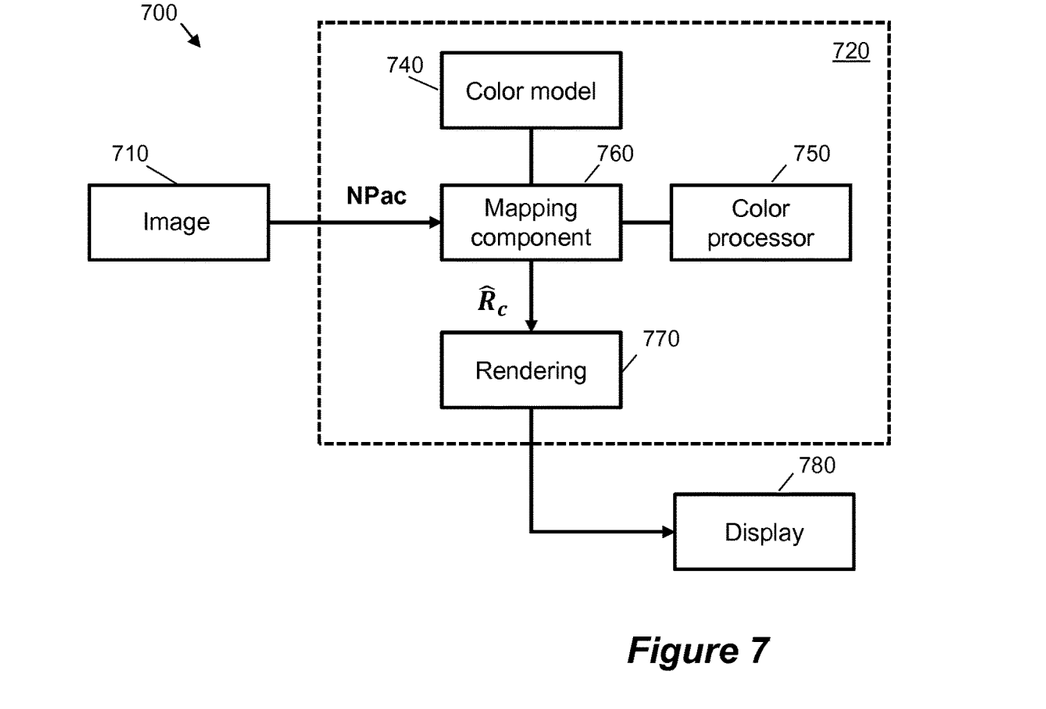
FIG. 7 is a schematic diagram showing components for rendering an image on a display according to an example.

FIG. 7 shows an example 700 of a system 720 for generating a print preview of an image 710 to be printed. This example system 720 uses an updated color model as configured by, for example, the system 200 of FIG. 2. The system 720 may provide an implementation of at least a portion of image processor 120. The components of system 720 may also, in some cases, comprise the components of the system 200; although in other cases system 720 may be implemented separately from system 200, e.g. may be arranged to use data representative of an updated color model as generated by a separate system 200.

The system 720 of FIG. 7 comprises a color model 240, a color processor 750, a mapping component 760 and a rendering component 770. The mapping component 760 is arranged to receive data derived from the image 710 to be printed. In FIG. 7, the image 710 is processed using one or more print pipeline operations to generate one or more NPac vectors, NPac. The image may be generated using a publishing application arranged to output NPac vectors and/or may be processed by a print driver to generate NPac vectors from image data (e.g. from an RGB image or data as output by publishing or image processing application). Under instruction of the color processor 750, mapping component 760 uses the color model 240 to compute corrected spectral reflectance values, $\hat{R}_C$. For example, the mapping component 760 may be arranged to apply a correction parameter in the form of matrix T as described above. The corrected spectral reflectance values, $\hat{R}_C$, may comprise a reflectance spectrum for each pixel or for each of a set of pixels, e.g. over a predefined area. The corrected spectral reflectance values, $\hat{R}_C$, may then be sent to the rendering component 760 to render an image 710 on a display 770. Display 770 may correspond to display 150 in FIG. 1. Rendering component 760 is arranged to process corrected spectral reflectance values, $\hat{R}_C$, and outputs display control data to render a print preview on display 770 that is representative of the colorimetries resulting from those reflectance values. For example, colorimetries may be obtained from the corrected reflectance values, e.g. CIEXYZ or CIELAB values may be determined by taking the corrected reflectance values and by specifying an illuminant under which they are to be viewed. This illuminant may be D50 for standard print viewing. These colorimetries may then be transformed to values for a display, e.g. RGB values, using known color management transformations, e.g. by using a display's ICC profile to transform the colorimetries to device-specific RGB values.

A display output generated by system 720 provides a display visualization of an image or document to be printed that follows the optical additivity of the human visual system as well as the complex non-linearities of a printing pipeline. It further provides a heuristic correction to boost color fidelity.

In a comparative case, an image or document to be printed may use International Color Consortium (ICC) color profiles to characterize a printing device and generate an on-screen print preview. These print previews are sometimes referred to as color-managed and/or soft-proofs. These techniques use tristimulus, e.g. CIELAB or CIEXYZ, color spaces, wherein a color profile in these color spaces defines each of a printing device and a display for the print preview. In this case, only overall color is taken into account. Furthermore, well-behaved transitions are assumed between nodes look-up tables used to implement the color profile mappings. As a result, the previews obtained in these comparative cases, do not take halftoning into account and only approximately predict a set of printed colors. This often leads to print artifacts, e.g. the output printed differs from the print preview on screen. This can either lead to less than perfect print output or waste as print runs need to be configured and repeated.

In comparison, a print preview generated using system 720 provides good agreement between a displayed output and a resultant printed output. For example, print artifacts that are present on a printed output are displayed in the print preview. This enables corrections to be made before inks are committed to paper. An example color model set out in the examples above is dependent on inks, print media and a printing device but not on higher level parameters such as different halftoning matrices or color profiling choices. This means that once the color model is configured and updated, these choices can be made and varied without the need for any changes in the system 720.

Figure 8:
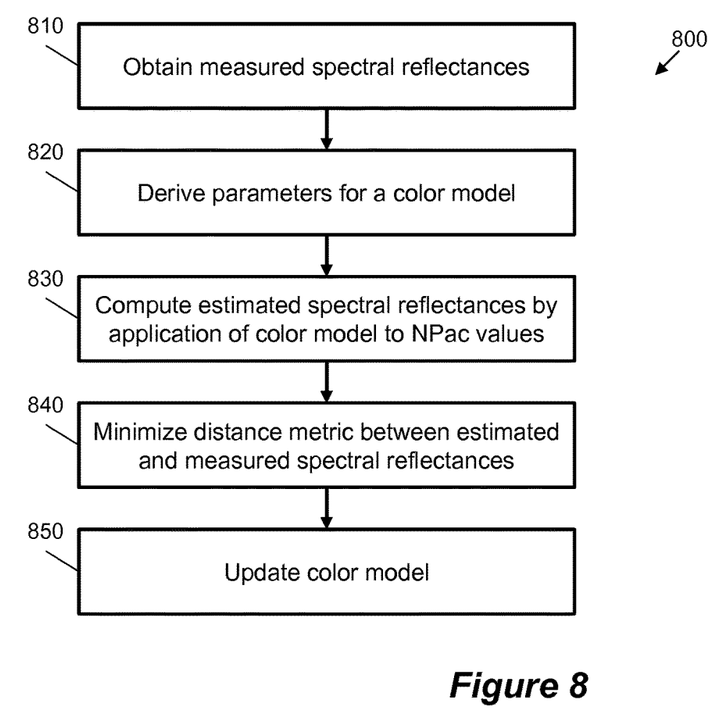
FIG. 8 is a flow chart showing a method of updating a color model according to an example.

An example method 800 that may be used for updating a color model is shown in FIG. 8. This method may be applied using the system 200 of FIG. 2. It may also be applied using an alternative system, image processor 120 of FIG. 1, or a generic processor adapted to process computer program code. At block 810, measurements representative of spectral reflectances of at least one halftone portion of printed output are obtained. These measurements may be obtained directly or indirectly from a spectrophotometer. At block 820, parameters are derived for a color model. The color model maps an input in NPac space to an output in reflectance space. For example, the color model may map a vector such as vector 640 in FIG. 6 to a vector such as vector 650 in FIG.

6. In more complex examples, it may take an image, derive NPac values for pixels in that image and output a plurality of reflectance spectra representative of an appearance of the image. The color model may comprise the application of one or more of the following spectral models: Kubelka-Munk, Neugebauer and Yule-Nielsen. Once parameters for a color model have been derived, estimated reflectances are computed by applying the color model to NPac values at block 830. These NPac values are those used to instruct the printing of each halftone portion. At block 840, a minimization of a distance metric between estimated and measured spectral reflectances is executed. This results in a multi-dimensional correction factor. This correction factor may then be used to update the color model at block 850, i.e. to add a correction that may be employed to the original color model to increase accuracy.

Figure 9:
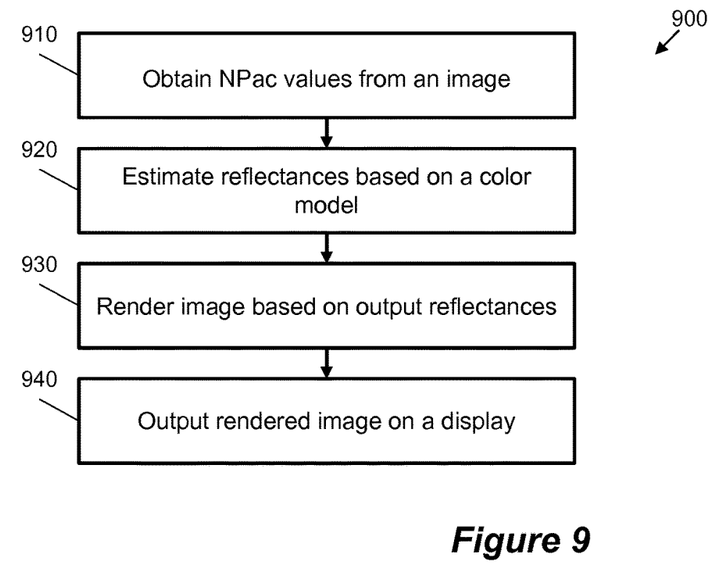
FIG. 9 is a flow chart showing a method of rendering an image on a display according to an example.

An example method 900 for rendering an image based on a color model is shown in FIG. 9. This method may be applied using the system 720 of FIG. 7. It may also be applied using an alternative system, image processor 120 of FIG. 1, or a generic processor adapted to process computer program code. At block 910, NPac vectors are obtained for a halftone image. This may comprise preparing an image for print, e.g. generating print data without actually generating a printed output. At block 920, a color model is used to estimate, e.g. predict, reflectances of the image for print. This color model maps the obtained NPac vectors to a set of estimated reflectances. At block 930, an image for display is rendered using the estimated reflectances. At block 940, the image for display is output, e.g. as a print preview on a display such as 150 or 770.

In one example, a technique for spatial subsampling is used to accurately render an image on a display. For example, this technique may be used as part of the implementation of block 910 of FIG. 9, image processor 120 of FIG. 1 and/or mapping component 760 of FIG. 7. Alternatively, it may be implemented by a bespoke component. This technique is consistent with the spatio-spectral models described above.

Figure 10:
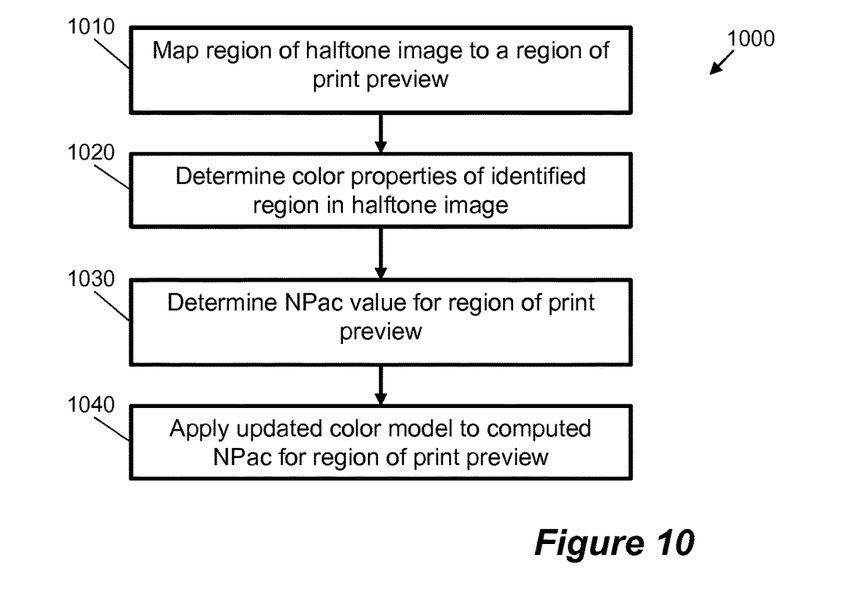
FIG. 10 is a flow chart showing a method of applying an updated color model to generate a print preview according to an example.

FIG. 10 shows an exemplary method of spatial subsampling for generating a print preview. In this case, an image to be printed, such as 110 or 710, may be at a print resolution that is higher than a desired display resolution. For example, an image to be printed may be defined at a resolution of 300 pixels-per-square-inch (PPI) or higher, whereas an image may be displayed on a monitor at a resolution of 72 PPI. Using the system 720 of FIG. 7, and/or the method 900 of FIG. 9, a reflectance spectrum may be generated for a group of one or more pixels. Each reflectance spectrum is then mapped to a pixel color value for output on a display, for example using the process described above. Hence, an image for display resulting from rendering component 770 or block 930 may comprise a very large image that cannot be viewed in its entirety on a display. This requires a method for computing accurate representations of halftone prints at lower resolution.

Turning to FIG. 10, at block 1010 a region of a halftone image is selected. For example, an image for display 710 in FIG. 7 may be mapped to a lower resolution print preview image; in this case, each pixel in the print preview image corresponds to a group of a plurality of pixels of the original image for display. Hence, conversely a set of regions in the original image are mapped to a region consisting of one or more pixels of the print preview. At block 1010, the first of these regions in the original image is selected. At block 1020, a set of color properties are determined for the pixels in the selected region of the original image. These color properties may comprise determining how many pixels within the selected region are represented by a particular NP. At block 1030, a corresponding NPac value of the region of the print preview is determined based on the determined color properties. This may comprise using a ratio of the determined number of pixels for each NP to a size of the portion of the halftone image to determine an area coverage for the portion for each NP. For example, if a selected portion of the original image is an 8 by 8 pixel block, it may have 12 Cyan (C) pixel, 24 Cyan, Magenta and Yellow (CMY) pixels and 8 Magenta (M) pixel. Hence, an area coverage for C is 12/(8*8)=0.1875, an area coverage for CMY is 0.375 and an area coverage for M is 0.125. This results in an NPac vector for the region of the print preview with values of: [C=0.1875, Y=0, M=0.125, CM=0, CY=0, MY=0, CMY=0.375, W=0.3125] or [0.1875, 0, 0.125, 0, 0, 0, 0.375, 0.3125]. At block 1040, a color model, such as that resulting from the methods previously described, is applied to the one or more NPac values for the print preview region. This may comprise inputting a determined NPac vector corresponding to a print preview pixel into mapping component 760. Alternatively, the blocks of method 1000 may be performed as a first stage in the mapping component 760.

In some examples, the mapping between the region of the halftone image and print preview corresponds to determining a ratio of the resolution of the print preview to the halftone image and scaling the region of the halftone image by that ratio. In further examples, the mapping consists of scaling by the aforementioned ratio together with an additional zoom factor. For example, the following equation may be used:

$$\text{region\_size} = \text{zoom\_factor} * \frac{\text{halftone\_resolution}}{\text{screen\_resolution}} + \varepsilon$$

$\varepsilon$ being an additional factor for a border than may be non-zero to improve smoothness. In this case, a square region of the original halftone image with sides of region_size pixels may map to each pixel in the print preview.

In some examples, the method of FIG. 10 may be performed by a print preview component comprising a reduction component to apply the aforementioned region mapping and a color determination component to determine one or more reflectance values for a print preview image. These components may form part of one of the other described components, for example, image processor 120 or mapping component 760. These components enable a color model, for example comprising application of Kubelka-Munk, Neugebauer and Yule-Nielsen models followed by a correction factor, to be used to computer a color for each display pixel of a print preview, wherein the color is derived from a halftone NPac of the region corresponding to it in print. This ensures that a specific halftone structure corresponding to the display pixel informs its appearance. It also takes phenomena like optical dot gain (e.g. as modeled by a Yule-Nielsen n exponent) into account in a locally-specific way.

Certain examples as described herein provide greater accuracy of print preview before printing. This minimizes wasted prints. Certain examples provide an ability to anticipate artifacts that color-only methods (e.g. based on ICC profiles) ignore. Certain examples also provide increased flexibility. A set of printer-parameters may be computed once, e.g. using the method of FIG. 8, and then used with, amongst others, any color pipeline, halftoning matrix and profiling choice. Certain examples herein enable improved predictability and increased production efficiency. As an example, using 4 CMYK aqueous die-based inks and a set of around 3000 test samples, a comparative example using Kubelka-Munk, Neugebauer and Yule-Nielsen models provided the following CIE DE (delta E) 2000 (i.e. color difference) values:

| Median $\Delta E_{00}$* | 95$^{th}$ Percentile $\Delta E_{00}$* | Maximum $\Delta E_{00}$* |
|---|---|---|
| 4.6 | 11.3 | 17.4 | whereas using the examples described herein, e.g. systems 200 and 720 and/or methods 8 and 9, the following CIE DE 2000 values were measured:

| Median $\Delta E_{00}$* | 95$^{th}$ Percentile $\Delta E_{00}$* | Maximum $\Delta E_{00}$* |
|---|---|---|
| 1.3 | 3.7 | 9.0 |

Similarly, a system using 6 CcMmYK latex inks and the presently described examples, produced the following CIE DE 2000 values:

| Median $\Delta E_{00}$* | 95$^{th}$ Percentile $\Delta E_{00}$* | Maximum $\Delta E_{00}$* |
|---|---|---|
| 1.3 | 2.8 | 6.5 |

Figure 11:
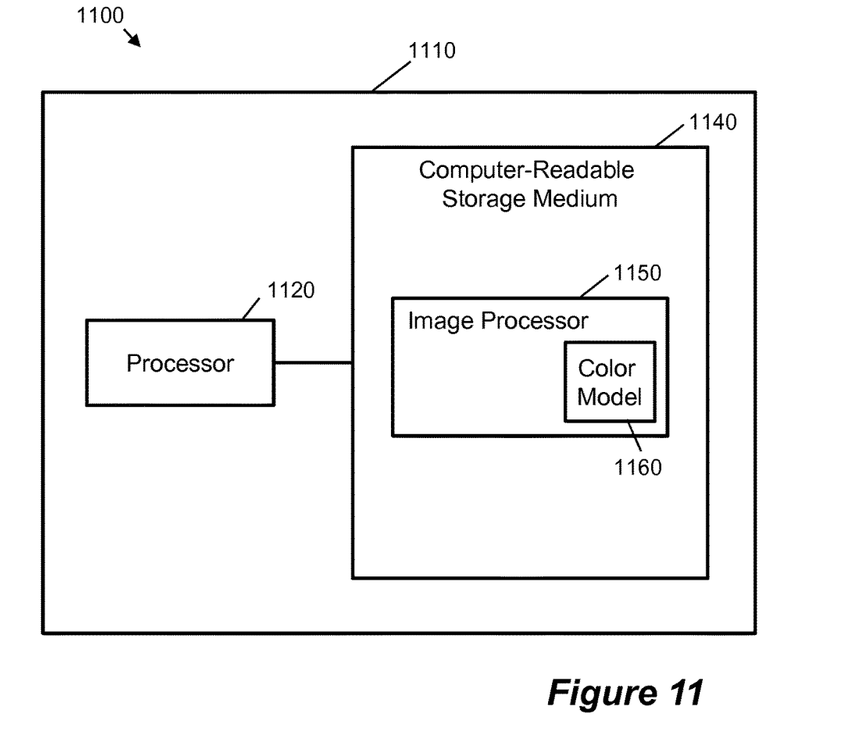
FIG. 11 is a schematic diagram showing an exemplary computer system according to an example.

Certain methods and systems as described herein may be implemented by a processor that processes computer program code that is retrieved from a non-transitory storage medium. FIG. 11 shows an example 1100 of a computer device 1110 comprising a computer-readable storage medium 1140 coupled to a processor 1120. Computer-readable media 1140 can be any media that can contain, store, or maintain programs and data for use by or in connection with an instruction execution system. Computer-readable media can comprise any one of many physical media such as, for example, electronic, magnetic, optical, electromagnetic, or semiconductor media. More specific examples of suitable computer-readable media include, but are not limited to, a hard drive, a random access memory (RAM), a read-only memory (ROM), an erasable programmable read-only memory, or a portable disc. In FIG. 11, the computer-readable storage medium comprises computer program code to implement an image processor 1150 and data representative of a color model 1160. The image processor 1150 may implement one or more of the methods described above.

The above embodiments are to be understood as illustrative examples. Further examples are envisaged. For example, the correction parameter, such as the matrix T may be derived and/or applied in either linear or Yule-Nielsen adjusted CIE XYZ space. In these cases the Yule-Nielsen non-linearity may not be applied, e.g. only the linear Neugebauer model is used (with or without the Kubelka-Munk model). In other words, a non-linearity as modelled by the T matrix may be sufficient to account for a non-linearity of the system without the need of the Yule-Nielsen modification of the Neugebauer model. In certain cases this can lead to faster computation. Although an exemplary color model has been described with reference to the Kubelka-Munk, Neugebauer and Yule-Nielsen models, one or more alternative or complementary models may also be used, e.g. Yule-Clapper and/or models incorporating more complex modelling of the spectral characteristics of a printing fluid on a print medium. Although the term "image" has primarily been used herein to refer to an input to a printing pipeline, e.g. at least image processor 120, it is to be understood that this term encompasses all possible documents to be printed including text, images, illustrations, etc. In each system described certain components that may be present have been omitted for clarity. Each of examples 100, 200 and 700 may comprise additional components that are not shown, or may omit certain shown components for particular implementations, while enabling at least certain ones of the functions described herein. Moreover, system components may be combined or split depending on the implementation; for example, each of systems 200 and 720 may be implemented by a single image or color processor. In one variation, the lower sensitivity of the human visual system to hue changes and higher sensitivity to lightness changes may be used to reduce computation. For example, image data may be mapped to YCbCr space. In this case, so that when zooming in on a halftone image to generate a print preview, only a lightness channel (Y) may be recomputed while chromatic channels may be up or down sampled. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims

The invention claimed is:

1. A printing process comprising:
   printing an ink template with multiple test portions;
   measuring a spectral reflectance of each test portion to obtain a plurality of measured spectral reflectance values, each value being representative of a measured spectral reflectance of a halftone portion of a printed output generated by a particular printing device and each halftone portion being printed with a printing fluid at a particular area coverage expressed as a Neugebauer Primary area coverage vector, each entry in the vector being representative of a proportion of a Neugebauer Primary to be printed using the printing fluid of the printing device;
   deriving parameters for a color model mapping a Neugebauer Primary area coverage vector to a reflectance spectrum;
   estimating spectral reflectance values by applying the color model to the Neugebauer Primary area coverage vectors;
   minimizing a distance metric between the estimated spectral reflectance values and the measured spectral reflectance values to generate a multi-dimensional correction parameter; and
   updating the color model to include the multi-dimensional correction factor;
   applying the updated color model to a halftone image to generate a print preview with a lower resolution than the halftone image; and
   displaying the print preview;
   wherein the process also comprises, for a plurality of regions in the halftone image:
      mapping a selected portion of the halftone image to a corresponding region of the print preview; and
      determining a color for the corresponding region of the print preview by:

determining Neugebauer Primary area coverage values for pixels in the selected portion of the halftone image;

determining a Neugebauer Primary area coverage value for the corresponding region of the print preview based on the determined Neugebauer Primary area coverage values for the pixels in the selected portion of the halftone image; and applying the updated color model to the Neugebauer Primary area coverage value for the corresponding region of the print preview, wherein the output of the updated color model is used to set the color of the corresponding region of the print preview.

2. The method of claim 1, wherein the color model comprises application of Kubelka-Munk, Neugebauer and Yule-Nielsen models, and wherein the multi-dimensional correction factor is applied following application of the Kubelka-Munk, Neugebauer and Yule-Nielsen models.

3. The method of claim 1, wherein the mapping of a selected portion of the halftone image to a corresponding region of the print preview comprises:

determining a ratio of a resolution of the print preview to a resolution of the halftone image;

scaling by the ratio and an additional zoom factor.

4. The method of claim 1, wherein determining at least one Neugebauer Primary area coverage value for the corresponding region of the print preview comprises:

determining a Neugebauer Primary for each pixel in the portion of the halftone image;

determining a number of pixels in the portion of the halftone image for each Neugebauer Primary;

using a ratio of the determined number of pixels to a size of the portion of the halftone image to determine an area coverage for the portion for each Neugebauer Primary.

5. A printing process comprising:

printing an ink template with multiple test portions;

measuring a spectral reflectance of each test portion to obtain a plurality of measured spectral reflectance values, each value being representative of a measured spectral reflectance of a halftone portion of a printed output generated by a particular printing device and each halftone portion being printed with a printing fluid at a particular area coverage expressed as a Neugebauer Primary area coverage value for printing;

deriving parameters for a color model mapping a Neugebauer Primary area coverage value to at least one spectral reflectance value;

estimating spectral reflectance values by applying the color model to the Neugebauer Primary area coverage values for printing;

minimizing a distance metric between the estimated spectral reflectance values and the measured spectral reflectance values to generate a multi-dimensional correction parameter, the multi-dimensional correction parameter comprising an m-by-n matrix where m is a number of measured spectral reflectances and n is representative of a number of terms in a distance minimization function that is applied to the estimated spectral reflectance values;

updating the color model to include the multi-dimensional correction factor;

applying the updated color model to a halftone image to generate a print preview; and displaying the print preview.

6. The method of claim 5 wherein n is of an order of a polynomial, the polynomial consisting of monomials resulting from products of the estimated spectral reflectances.

7. A printing system comprising:

a printing device to print an ink template with multiple test portions;

a spectrophotometer to measure a spectral reflectance of each test portion;

a display;

an image processor operatively connected to the spectrophotometer and the display; the image processor including a color model mapping a Neugebauer Primary area coverage vector to a reflectance spectrum and program code to:

estimate spectral reflectance values based on Neugebauer Primary area coverage vectors associated with spectral reflectance values measured with the spectrophotometer;

generate a multi-dimensional correction parameter based on the estimated spectral reflectance values and the measured spectral reflectance values;

update the color model based on the generated multi-dimensional correction parameter;

apply the updated color model to a halftone image to generate a print preview with a lower resolution than the halftone image; and display the print preview with the display;

wherein the image processor also includes program code to:

map a selected portion of the halftone image to a corresponding region of the print preview;

determine a Neugebauer Primary area coverage values for pixels in the selected portion of the halftone image;

determine a Neugebauer Primary area coverage value for the corresponding region of the print preview based on the determined Neugebauer Primary area coverage values for the pixels in the selected portion of the halftone image; and map the Neugebauer Primary area coverage value for the corresponding region of the print preview to a reflectance spectrum; and use the reflectance spectrum to set the color of the corresponding region of the print preview.

8. The system of claim 7, wherein the image processor also includes program code to determine a ratio of a resolution of the print preview to a resolution of the halftone image and to scale the selected portion of the halftone image by the ratio and an additional zoom factor.

9. The system of claim 7, wherein the image processor also includes program code to:

determine a number of pixels in the selected portion of the halftone image for each Neugebauer Primary; and use a ratio of the determined number of pixels to a size of the selected portion of the halftone image to determine an area coverage for the selected portion for each Neugebauer Primary.

* * * * *